March 16, 1943.   H. S. OGDEN ET AL   2,314,239
CONTROL SYSTEM AND DEVICE
Filed July 24, 1941
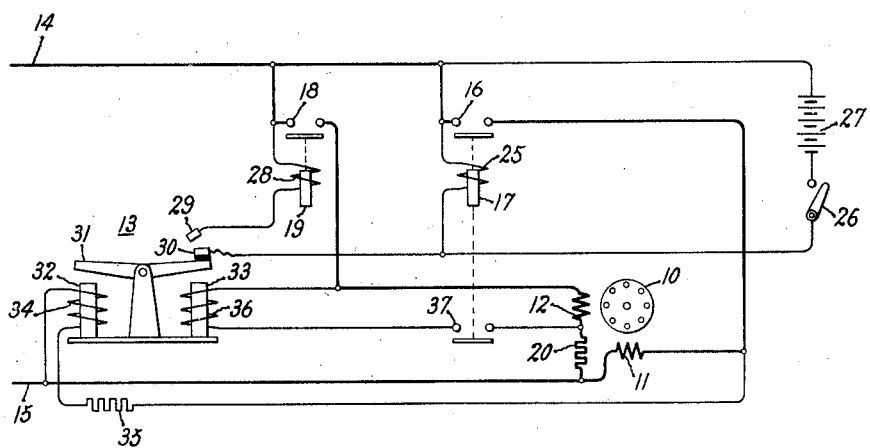
Inventors:
Harold S. Ogden,
Rembert C. Alley,
by Harry E. Dunham
Their Attorney.

Patented Mar. 16, 1943

2,314,239

UNITED STATES PATENT OFFICE 2,314,239

CONTROL SYSTEM AND DEVICE

Harold S. Ogden and Rembert C. Alley, Erie, Pa., assignors to General Electric Company, a corporation of New York Application July 24, 1941, Serial No. 403,798

2 Claims. (Cl. 172—279)

Our invention relates to control systems and devices and more particularly to means for starting alternating current motors of the split phase type.

In order to compensate for line voltage fluctuations and to insure that the starting winding of an alternating current split phase motor is disconnected when the motor has reached a predetermined speed in its starting sequence, it is known to use a balanced-beam relay having restraining and operating coils both of which are energized in response to a function of the line current. In these known devices, however, the restraining coil has been a series or current-responsive coil. Such a relay must carry the high motor starting current and operates by exerting a restraining force which diminishes as the line current decreases. This type of relay is not suitable for the starting of motors having different current ratings, since the restraining coil of any particular device must be coordinated with the current rating of the motor to which it is connected. Furthermore, such a relay is not suitable for the control of motors having very high current ratings without the addition of auxiliary apparatus to reduce the restraining coil current to a reasonable value.

Accordingly, it is an object of our invention to provide a new and improved control system for the starting of split phase alternating current motors which shall provide compensation for line voltage fluctuation.

It is a further object of our invention to provide a starting relay for split phase alternating current motor starting systems which shall be adaptable to the control of motors of large current ratings without the interposition of auxiliary apparatus, and which shall be adapted to the control of motors of different current ratings without the alteration of any of the parts of the relay.

A preferred form of our invention comprises a differential starting relay provided with a restraining coil responsive to the voltage drop across the starting winding of a split phase alternating current motor and an operating coil responsive to the voltage drop across the running winding of the motor. Such a relay has the advantage that it is adaptable to the control of all motors having substantially the same predetermined voltage drop across their running and starting windings. Since many motors of different sizes are designed to have approximately the same voltage drop across their operating windings, it will be evident that our relay is of considerably more general application than devices heretofore known. Furthermore our relay is suitable for the control of motors having very large current ratings without the addition of auxiliary apparatus and without the inconvenience of a restraining coil having very large current carrying capacity. For example, our relay is particularly well suited for control of the single-phase alternating current blower motors used on electric locomotives and the like.

For a more complete understanding of our invention and for a further appreciation of its many objects and advantages reference should now be had to the following detailed specification taken in connection with the accompanying drawing, the single figure of which is a simplified circuit diagram of a motor starting control system embodying our invention.

Referring now to the drawing, I have illustrated a split phase alternating current motor comprising a short circuited armature 10, a running winding 11 and a starting winding 12 in combination with a differential balanced-beam starting relay 13 and suitable connections to a source of alternating current supply 14 and 15.

The running winding 11 is arranged for connection to the source of supply 14, 15 through the main contacts 16 of a running contactor 17. The starting winding 12 is arranged for connection to the source of supply 14, 15 in parallel with the running winding 11 through the contacts 18 of a starting contactor 19. In order to obtain the necessary quadrature phase relation of the currents traversing the windings 11 and 12, the running winding 11 is preferably wound in such a manner that its inductance is considerably higher than that of the starting winding 12. To further assist in obtaining a nearly ninety degree relation between the currents in the windings 11 and 12 a resistor 20 is permanently connected in series with the starting winding 12. Thus the running winding 11 is predominently inductive while the starting winding 12, in combination with the resistor 20, is predominantly resistive. For this reason the current in the winding 11 lags the current in the winding 12 by substantially ninety electrical degrees, thereby to provide a starting torque.

The running contactor 17 includes an operating coil 25 which may be connected by means of a control switch 26 directly across the terminals of a source of control voltage such as a storage battery 27. The starting contactor 19 includes an operating coil 28 which may likewise be connected across the battery 27 through the control switch 26 and through a pair of control contacts 29, 30 of the starting relay 13.

The starting relay 13 comprises a pivotally mounted floating magnetic armature 31 arranged to be differentially influenced by a pair of oppositely disposed electroresponsive magnetic cores 32 and 33. The core 32 is provided with an energizing coil 34 which is connected through a resistor 35 across the terminals of the running winding 11 of the motor, thereby to provide a substantially constant restraining force for the relay 13. The core 33 carries an energizing coil 36 connected directly across the terminals of the starting winding 12 of the motor through a pair of interlock contacts 37 of the running contactor 17. The winding 36 acts as an operating winding for the relay 13 to open the relay contacts 29 and 30 at a predetermined motor speed.

In operation the motor is started by closing the control switch 26. Upon closure of the switch 26 an energizing circuit is established for the operating coil 25 and the running contactor 17 is actuated to close its contacts 16 and 37. Closure of the contacts 16 connects the running winding 11 directly across the source of supply 14, 15, and closure of the contacts 37 connects the operating winding 36 of the relay 13 directly across the starting winding 12 of the motor. Since the running winding 11 now carries a current, the restraining coil 34 of the relay 13 is energized by the voltage drop across the winding 11. Energization of the magnet core 32 produces a force which attracts the associated end of the balanced armature 31 thereby to close the relay contacts 29 and 30. Closure of the contacts 29 and 30 completes an energizing circuit for the operating coil 28 of the starting contactor 19. When the starting contactor 19 is actuated it closes its contacts 18 to connect the starting winding 12 to the source of supply 14, 15 in parallel to the running winding 11. A flow of current through the starting winding 12 provides a voltage drop for energizing the operating winding 36 of the relay 13. When the motor is at standstill, however, the voltage drop across the starting winding 12, and consequently the energization of the operating winding 36 of the relay 13, is very small so that the relay remains in its contact closing position under the influence of its restraining coil 34.

As the motor armature 10 comes up to speed the voltage across the starting winding 12 increases proportionately while the voltage across the running winding 11 remains substantially constant. The starting relay 13 is so designed that at a predetermined point in the starting sequence the attraction of the magnet core 33 of the relay is sufficient to overcome the attractive force of the substantially constantly energized magnet core 32, thereby to move the relay armature 31 to its contact opening position and deenergize the operating coil 28 of the starting contactor 19. Upon deenergization of the starting contactor 19 the starting winding 12 is disconnected from the supply source at the contacts 18. After disconnection of the winding 12, however, a voltage still exists between the terminals of the operating winding 36 of the relay 13 due to induction from the rotating armature 10. While the induced voltage in the starting winding 12 is less than the applied voltage, and therefor the energization of the operating winding 36 is diminished upon disabling of the starting contactor 19, the energization of the operating winding 36 of the relay is still sufficient to hold the armature 31 in its contact opening position after it has once been actuated to this position.

It will now be observed that we have provided a differential starting relay for a split phase alternating current motor in which the balanced-beam principle is used to insure that the relay will be operated at a predetermined motor speed regardless of fluctuations of the line voltage. Furthermore, our relay comprises a restraining coil and an operating coil, both of which are of the shunt type so that they are not limited in their utility to a motor of a predetermined current rating.

While we have shown and described a preferred embodiment of our invention by way of illustration, many further modifications will undoubtedly occur to those skilled in the art. We therefore wish to have it understood that we intend by the appended claims to cover all such modifications as fall within the true spirit and scope of our invention.

What we claim as new and desire to secure by Letters Patent of the United States:

1. In combination, a split phase alternating current motor having a running winding and a starting winding, means for connecting said running winding to an alternating current supply source, and a balanced beam motor starting relay comprising electromagnetic means for energizing said starting winding from said supply source in accordance with the voltage drop across said running winding and electromagnetic means for disabling said starting winding in response to the voltage drop across said starting winding, said electromagnetic means being disposed in opposing relation to insure the disabling of said starting winding at a predetermined motor speed irrespective of variations in the voltage of said source of supply.

2. In combination, a split phase alternating current motor having a running winding and a starting winding, means for connecting said running winding to a source of alternating current supply, and a differential balanced beam electromagnetic relay for controlling said starting winding, said relay comprising a restraining coil energized in accordance with the voltage drop across said running winding to actuate said relay to connect said starting winding to said source of supply, and an oppositely acting operating coil energized in accordance with the voltage drop across said starting winding to actuate said relay to disconnect said starting winding from said source of supply, said coils cooperating to insure the operation of said relay at a predetermined motor speed, irrespective of variations in the voltage of said source of supply.

HAROLD S. OGDEN.
REMBERT C. ALLEY.